US012794601B2

(12) United States Patent
Dimou et al.

(10) Patent No.: US 12,794,601 B2
(45) Date of Patent: Nov. 10, 2026

(54) DYNAMIC TRIGGERING OF TYPE 3 CODEBOOK FEEDBACK

(71) Applicant: QUALCOMM Incorporated, San Diego, CA (US)

(72) Inventors: Konstantinos Dimou, New York, NY (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 18/255,710

(22) PCT Filed: Jan. 24, 2022

(86) PCT No.: PCT/US2022/070315
§ 371 (c)(1),
(2) Date: Jun. 2, 2023

(87) PCT Pub. No.: WO2022/170300
PCT Pub. Date: Aug. 11, 2022

(65) Prior Publication Data

US 2024/0014949 A1 Jan. 11, 2024

(30) Foreign Application Priority Data

Feb. 4, 2021 (GR) .............................. 20210100077

(51) Int. Cl.
*H04L 1/1829* (2023.01)
*H04L 1/1812* (2023.01)
*H04W 72/232* (2023.01)

(52) U.S. Cl.
CPC .......... *H04L 1/1854* (2013.01); *H04L 1/1812* (2013.01); *H04W 72/232* (2023.01)

(58) Field of Classification Search
CPC ... H04L 1/1812; H04L 1/1822; H04L 1/1854; H04L 1/1864; H04W 72/232
See application file for complete search history.

(56) References Cited

U.S. PATENT DOCUMENTS 11,750,336 B2 * 9/2023 Sun ....................... H04L 1/1887 370/329
12,047,181 B2 * 7/2024 Yang ..................... H04L 1/1861
(Continued)

FOREIGN PATENT DOCUMENTS

CN 116897577 A * 10/2023 ........... H04L 5/0055
WO WO-2022151263 A1 * 7/2022 ........... H04L 1/1822

OTHER PUBLICATIONS

International Search Report and Written Opinion—PCT/US2022/070315—ISA/EPO—Apr. 8, 2022.
(Continued)

*Primary Examiner* — Eric Nowlin
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a number of hybrid automatic repeat request (HARQ) bits to report to a base station for deferred HARQ or cancelled HARQ for one or more HARQ processes. The UE may transmit HARQ bits for the deferred HARQ or cancelled HARQ, up to the number of HARQ bits, after receiving downlink control information requesting the HARQ bits. Numerous other aspects are described.

30 Claims, 11 Drawing Sheets

(56) References Cited

U.S. PATENT DOCUMENTS

| | | | | |
|---|---|---|---|---|
| 2016/0174281 | A1* | 6/2016 | Wen | H04W 76/15 370/329 |
| 2021/0409165 | A1* | 12/2021 | Wang | H04L 1/1896 |
| 2022/0060288 | A1* | 2/2022 | Sun | H04W 72/23 |
| 2022/0201724 | A1* | 6/2022 | Zhang | H04L 1/1896 |
| 2022/0240242 | A1* | 7/2022 | Elshafie | H04L 5/0044 |
| 2022/0329361 | A1* | 10/2022 | Babaei | H04L 1/1854 |
| 2022/0399978 | A1* | 12/2022 | Gao | H04L 5/0055 |
| 2023/0113343 | A1* | 4/2023 | Dimou | H04L 5/0044 370/329 |
| 2023/0171038 | A1* | 6/2023 | Yang | H04L 5/0055 370/329 |
| 2023/0354401 | A1* | 11/2023 | Elshafie | H04W 72/56 |
| 2023/0361938 | A1* | 11/2023 | He | H04W 72/232 |

OTHER PUBLICATIONS

Qualcomm Incorporated: "HARQ-ACK Enhancement for IOT and URLLC", 3GPP TSG RAN WG1 #104-e, R1-2101459, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, pp. 1-17, XP051971624, Section 5—Retransmission of dropped HARQ-ACK, pp. 1, 10, figures 1, 2, 8, 9, section 2, 5.

Wilus Inc: "Discussion on HARQ-ACK Enhancement for URLLC/IIoT", 3GPP Draft, 3GPP TSG RAN WG1 #104-e, R1-2101675, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), 10 Pages, XP051971828.

* cited by examiner

DYNAMIC TRIGGERING OF TYPE 3 CODEBOOK FEEDBACK

CROSS-REFERENCE TO RELATED APPLICATIONS

This Patent Application is a 371 national stage of PCT Application No. PCT/US2022/070315 filed on Jan. 24, 2022, entitled "DYNAMIC TRIGGERING OF TYPE 3 CODEBOOK FEEDBACK," which claims priority to Greece Patent Application No. 20210100077, filed on Feb. 4, 2021, entitled "DYNAMIC TRIGGERING OF TYPE 3 CODEBOOK FEEDBACK," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for dynamic triggering of type 3 codebook hybrid automatic repeat request feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors coupled to the memory, the one or more processors configured to receive an indication of a number of hybrid automatic repeat request (HARQ) bits to report to a network entity for deferred HARQ or cancelled HARQ for one or more HARQ processes, and transmit HARQ bits for the deferred HARQ or cancelled HARQ, up to the number of HARQ bits, after receiving downlink control information (DCI) requesting the HARQ bits.

In some aspects, a network entity for wireless communication includes a memory and one or more processors coupled to the memory, the one or more processors configured to transmit an indication of a number of HARQ bits that a UE is to report for deferred HARQ or cancelled HARQ for one or more HARQ processes, and receive HARQ bits for the deferred HARQ or cancelled HARQ, up to the number of HARQ bits, after transmitting DCI requesting the HARQ bits.

In some aspects, a method of wireless communication performed by a UE includes receiving an indication of a number of HARQ bits to report to a network entity for deferred HARQ or cancelled HARQ for one or more HARQ processes, and transmitting HARQ bits for the deferred HARQ or cancelled HARQ, up to the number of HARQ bits, after receiving DCI requesting the HARQ bits.

In some aspects, a method of wireless communication performed by a network entity includes transmitting an indication of a number of HARQ bits that a UE is to report for deferred HARQ or cancelled HARQ for one or more HARQ processes, and receiving HARQ bits for the deferred HARQ or cancelled HARQ, up to the number of HARQ bits, after transmitting DCI requesting the HARQ bits.

In some aspects, a non-transitory computer-readable medium storing a set of instructions for wireless communication includes one or more instructions that, when executed by one or more processors of a UE, cause the UE to receive an indication of a number of HARQ bits to report to a network entity for deferred HARQ or cancelled HARQ for one or more HARQ processes, and transmit HARQ bits for the deferred HARQ or cancelled HARQ, up to the number of HARQ bits, after receiving DCI requesting the HARQ bits.

In some aspects, a non-transitory computer-readable medium storing a set of instructions for wireless communication includes one or more instructions that, when executed by one or more processors of a network entity, cause the network entity to transmit an indication of a number of HARQ bits that a UE is to report for deferred HARQ or cancelled HARQ for one or more HARQ processes, and receive HARQ bits for the deferred HARQ or cancelled HARQ, up to the number of HARQ bits, after transmitting DCI requesting the HARQ bits.

In some aspects, an apparatus for wireless communication includes means for receiving an indication of a number of HARQ bits to report to a network entity for deferred HARQ or cancelled HARQ for one or more HARQ processes, and means for transmitting HARQ bits for the deferred HARQ or cancelled HARQ, up to the number of HARQ bits, after receiving DCI requesting the HARQ bits.

In some aspects, an apparatus for wireless communication includes means for transmitting an indication of a number of HARQ bits that a UE is to report for deferred HARQ or cancelled HARQ for one or more HARQ processes, and means for receiving HARQ bits for the deferred HARQ or cancelled HARQ, up to the number of HARQ bits, after transmitting DCI requesting the HARQ bits.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

Figure 1:
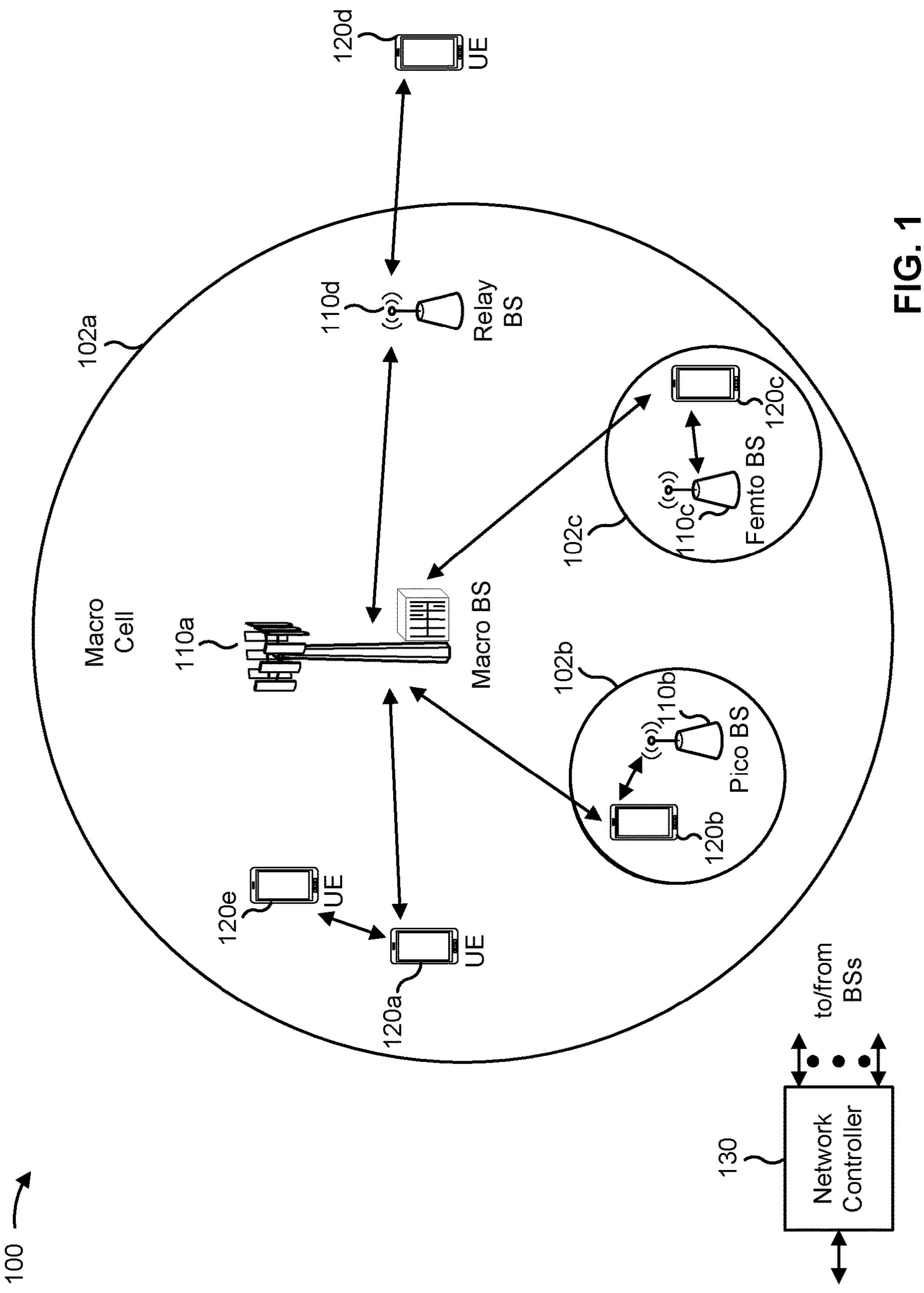
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of network entities, such as base stations 110 (shown as BS 110*a*, BS 110*b*, BS 110*c*, and BS 110*d*) and other network entities. A base station (BS) is a network entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

In some aspects, a base station may be an aggregated base station, a disaggregated base station, and/or one or more components of a disaggregated base station. A disaggregated base station may be part of an open RAN (O-RAN) architecture and may include a central unit (CU) that communicates with a core network via a backhaul link. Furthermore, the CU may communicate with one or more distributed units (DUs) via respective midhaul links. The DUs may each communicate with one or more radio units (RUs) via respective fronthaul links, and the RUs may each communicate with respective UEs 120 via radio frequency (RF) access links. The fronthaul link, the midhaul link, and the backhaul link may be generally referred to as "communication links". The DUs and the RUs may also be referred to as "O-RAN DUs (O-DUs)" and "O-RAN RUs (O-RUs)", respectively. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

In some aspects, the DUs and the RUs may be implemented according to a functional split architecture in which functionality of a network entity (e.g., base station 110, an eNB, a gNB) is provided by a DU and one or more RUs that communicate over a fronthaul link. Accordingly, as described herein, a network entity may include a DU and one or more RUs that may be co-located or geographically distributed. In some aspects, the DU and the associated RU(s) may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface. Accordingly, the DU may correspond to a logical unit that includes one or more base station functions to control the operation of one or more RUs.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network with network entities that include different types of BSs, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of network entities and may provide coordination and control for these network entities. Network controller 130 may communicate with the network entities via a backhaul. The network entities may also communicate with one another directly or indirectly via a wireless or wireline backhaul communication link.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a network entity, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
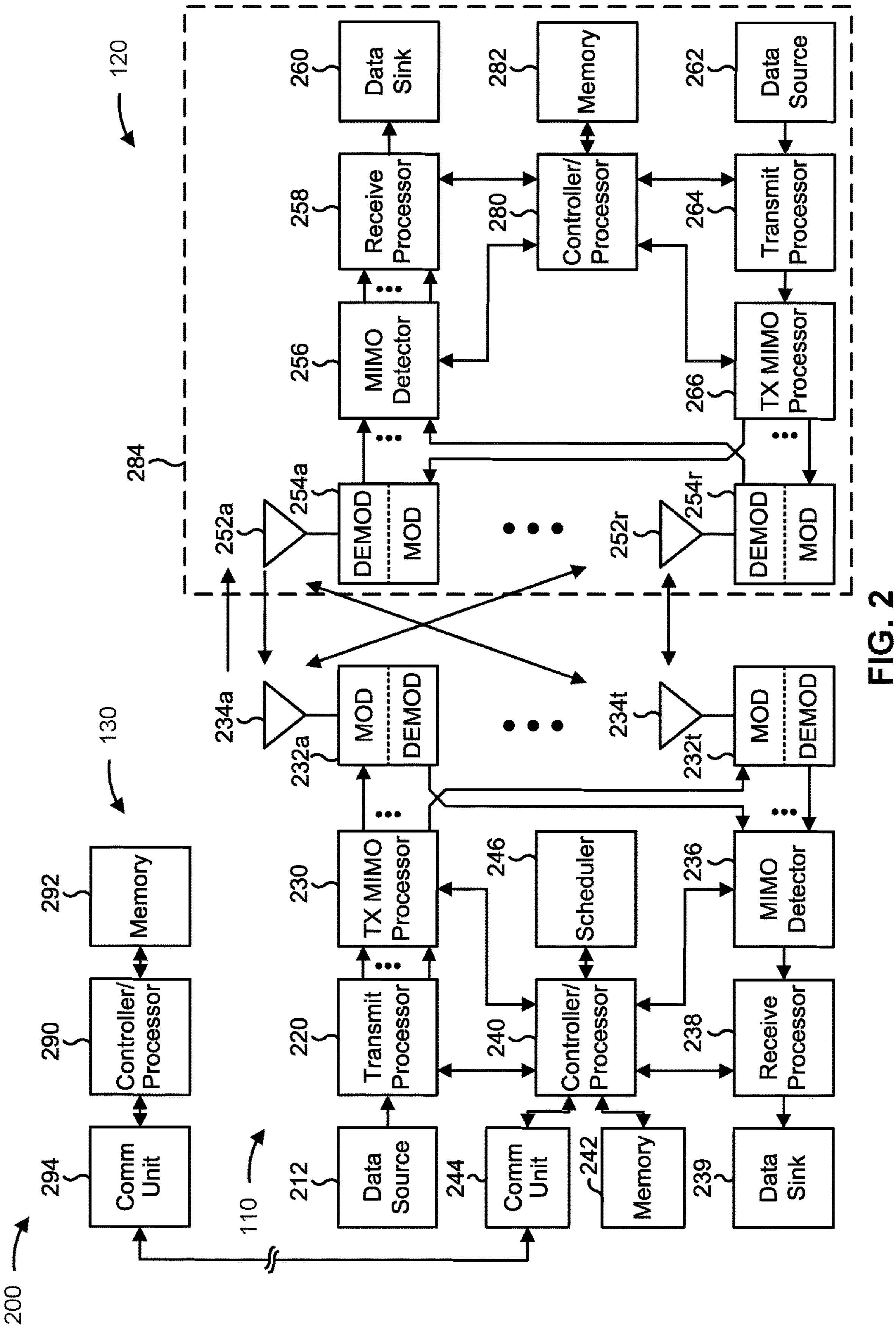
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

One or more antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., with reference to FIGS. 4-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., with reference to FIGS. 4-11).

A controller/processor of a network entity (e.g., controller/processor 240 of base station 110), controller/processor 280 of UE 120, and/or any other component(s) of FIG. 2 may perform one or more techniques associated with for dynamic triggering of type 3 codebook hybrid automatic repeat request (HARQ) feedback, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 includes means for receiving an indication of a number of HARQ bits to report to a base station for deferred HARQ or cancelled HARQ for one or more HARQ processes, and/or means for transmitting HARQ bits for the deferred HARQ or cancelled HARQ, up to the number of HARQ bits, after receiving downlink control information (DCI) requesting the HARQ bits. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282. In some aspects, UE 120 includes means for transmitting the HARQ bits using type 3 codebook.

In some aspects, a network entity (e.g., base station 110) includes means for transmitting, to a UE, an indication of a number of HARQ bits that the UE is to report for deferred HARQ or cancelled HARQ for one or more HARQ processes, and/or means for receiving HARQ bits for the deferred HARQ or cancelled HARQ, up to the number of HARQ bits, after transmitting DCI requesting the HARQ bits. The means for the network entity to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the network entity includes means for receiving the HARQ bits using type 3 codebook.

In some aspects, the network entity includes means for transmitting the indication in a radio resource control (RRC) message and transmitting the DCI as 1 bit. In some aspects, network entity includes means for transmitting the indication in the DCI.

In some aspects, the network entity includes means for selecting the number of HARQ bits based at least in part on one or more of a UE capability, uplink traffic conditions, or downlink traffic conditions.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
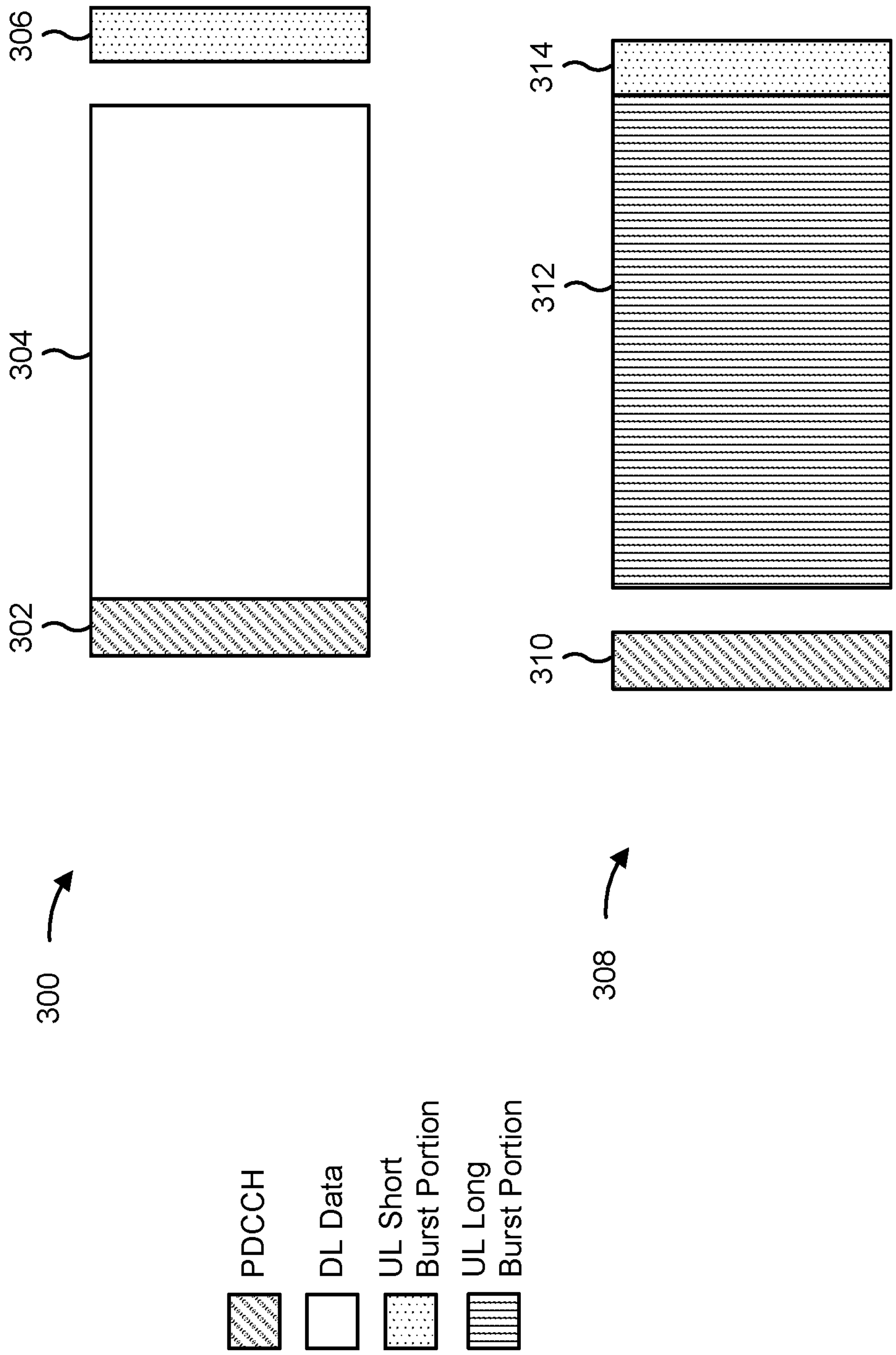
FIG. 3 is a diagram showing an example downlink-centric slot or communication structure and an uplink-centric slot or communication structure, in accordance with the present disclosure.

FIG. 3 is a diagram showing an example downlink (DL)-centric slot or communication structure 300 and an uplink (UL)-centric slot or communication structure 308 in accordance with the present disclosure. The DL-centric slot (or wireless communication structure) 300 may include a control portion 302 during which the scheduling entity (for example, UE or network entity) transmits various scheduling information or control information corresponding to various portions of the DL-centric slot to the subordinate entity (for example, UE). The control portion 302 may exist in the initial or beginning portion of the DL-centric slot 300. In some configurations, the control portion 302 may be a physical downlink control channel (PDCCH), as indicated in FIG. 3. In some aspects, the control portion 302 may include legacy PDCCH information, shortened PDCCH (sPDCCH) information, a control format indicator (CFI) value (for example, carried on a physical control format indicator channel (PCFICH)), one or more grants (for example, downlink grants, or uplink grants), among other examples, or combinations thereof.

The DL-centric slot 300 may also include a DL data portion 304 during which the scheduling entity (for example, a UE or a network entity) transmits DL data to the subordinate entity (for example, a UE) using communication resources utilized to communicate DL data. The DL data portion 304 may sometimes be referred to as the payload of the DL-centric slot 300. In some configurations, the DL data portion 304 may be a physical downlink shared channel (PDSCH).

The DL-centric slot 300 may also include an UL short burst portion 306 during which the subordinate entity (for example, UE) transmits reference signals or feedback to the scheduling entity (for example, UE or network entity) using communication resources utilized to communicate UL data. The UL short burst portion 306 may sometimes be referred to as an UL burst, an UL burst portion, a common UL burst, a short burst, an UL short burst, a common UL short burst, a common UL short burst portion, or various other suitable terms. In some aspects, the UL short burst portion 306 may include one or more reference signals. Additionally or alternatively, the UL short burst portion 306 may include feedback information corresponding to various other portions of the DL-centric slot 300. For example, the UL short burst portion 306 may include feedback information corresponding to the control portion 302 or the data portion 304. Non-limiting examples of information that may be included in the UL short burst portion 306 include an acknowledgement (ACK) signal (for example, a physical uplink control channel (PUCCH) ACK, a physical uplink shared channel (PUSCH) ACK, or an immediate ACK), a negative acknowledgement (NACK) signal (for example, a PUCCH NACK, a PUSCH NACK, or an immediate NACK), a scheduling request (SR), a buffer status report (BSR), a HARQ indicator, a channel state indication (CSI), a CQI, a sounding reference signal (SRS), a DMRS, PUSCH data, or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, or various other suitable terms. This separation provides time for the switch-over from DL communication (for example, reception operation by the subordinate entity (for example, network entity or UE)) to UL communication (for example, transmission by the subordinate entity (for example, UE)). The foregoing provides some examples of a DL-centric wireless communication structure, but alternative structures having similar features may exist without deviating from the aspects described herein.

The UL-centric slot (or wireless communication structure) 308 may include a control portion 310. The control portion 310 may exist in the initial or beginning portion of the UL-centric slot 308. The control portion 310 in may be similar to the control portion 302 described above with reference to the DL-centric slot 300. The UL-centric slot 308 may also include an UL long burst portion 312. The UL long burst portion 312 may sometimes be referred to as the payload of the UL-centric slot 308. "UL portion" may refer to the communication resources utilized to communicate UL data from the subordinate entity (for example, UE) to the scheduling entity (for example, UE or network entity). In some configurations, the control portion 310 may be a physical DL control channel PDCCH.

As illustrated, the end of the control portion 310 may be separated in time from the beginning of the UL long burst portion 312. This time separation may sometimes be referred to as a gap, guard period, guard interval, or various other suitable terms. This separation provides time for the switch-over from DL communication (for example, reception operation by the scheduling entity) to UL communication (for example, transmission operation by the scheduling entity).

The UL-centric slot 308 may also include an UL short burst portion 314. The UL short burst portion 314 may be similar to the UL short burst portion 306 described above with reference to the DL-centric slot 300 and may include any of the information described above. The foregoing is merely one example of an UL-centric wireless communication structure, and alternative structures having similar features may exist without deviating from the aspects described herein.

In one example, a wireless communication structure, such as a frame, may include both UL-centric slots and DL-centric slots in a slot format. In this example, the ratio of UL-centric slots to DL-centric slots in a frame may be dynamically adjusted based at least in part on the amount of UL data and the amount of DL data that are transmitted. For example, if there is more UL data, then the slot format may change such that the ratio of UL-centric slots to DL-centric slots is increased. Conversely, if there is more DL data, then the slot format may change such that the ratio of UL-centric slots to DL-centric slots is decreased.

As indicated above, FIG. 3 is provided as an example. Other examples may differ from what is provided with regard to FIG. 3.

Figure 4:
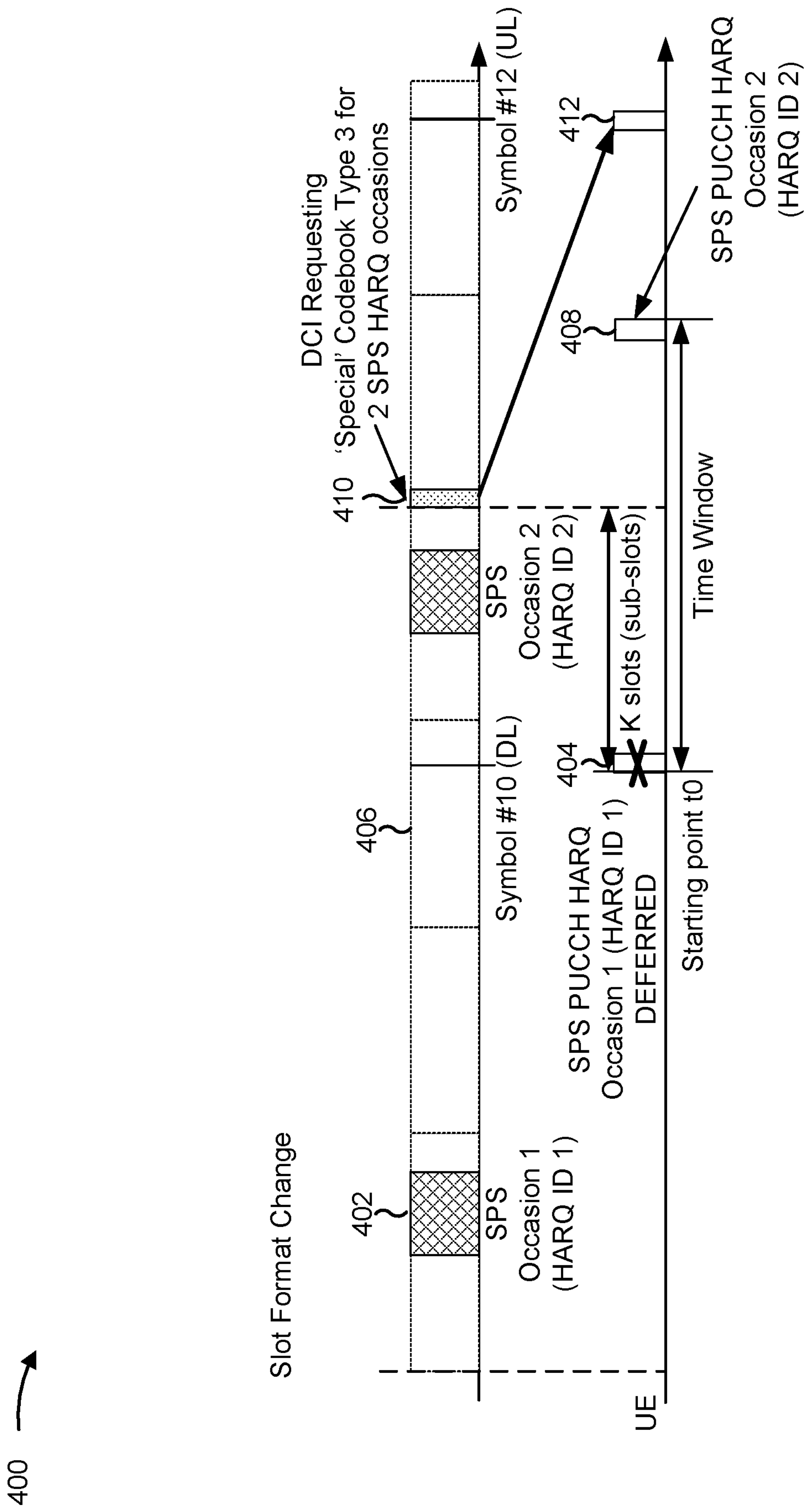
FIG. 4 is a diagram illustrating an example of downlink control information (DCI) for triggering hybrid automatic repeat request (HARQ) when there is a slot format change, in accordance with the present disclosure.

FIG. 4 is a diagram illustrating an example 400 of DCI for triggering HARQ when there is a slot format change, in accordance with the present disclosure.

Example 400 shows multiple slots in a slot format, where the slot format has changed for a UE (e.g., by a slot format indicator). For example, a semi-persistent scheduling (SPS) occasion 402 from a network entity may grant an uplink resource (e.g., uplink symbol 10) in slot 406 for HARQ feedback 404 for a first HARQ process (HARQ identifier (ID) 1). However, the network entity may change the slot format such that symbol 10 in slot 406 is not an uplink symbol, and slot 406 has fewer symbols for uplink. That is, symbol 10 in slot 406, which was previously an uplink symbol for transmitting HARQ feedback 404 for HARQ process ID 1, is now a downlink symbol. Therefore, HARQ feedback 404 must be deferred to a later symbol or slot. This may be an issue for ultra-reliable low-latency communication (URLLC), which has a very low error rate for highly reliable applications. HARQ feedback 404 may still need to be captured. Meanwhile, HARQ feedback 408 for another HARQ process ID is to be transmitted as well. To capture HARQ feedback that was deferred, the network entity may transmit DCI 410 that requests type 3 codebook HARQ bits for a last 16 HARQ processes (e.g., 16 bits). This may capture recent HARQ feedback, such as HARQ feedback 408 and HARQ feedback 412, which may be the deferred HARQ feedback 404 for HARQ ID 1 that is to be transmitted at uplink symbol #12 in a later slot. There may be K slots or sub-slots until an end of a next slot. If a slot format change affects multiple component carriers, then the number of HARQ bits may be specific to a component carrier or apply to all component carriers.

DCI 410 may be UE-specific DCI or group DCI. DCI 410 may include 1 bit for reporting deferred SPS PUCCH ACK/NACK. The HARQ bits to be reported may be type 3 HARQ-ACK codebook bits. Type 3 codebook feedback involves a set of rules for transmitting HARQ bits in the PUCCH or PUSCH for a PDSCH communication or an SPS PDSCH communication. A PUCCH resource indicator may be used for modified type 3 codebook feedback. Type 3 codebook feedback may be used when the UE is provided DCI for PDSCH HARQ-ACK one-shot feedback, which is a single chance to provide any HARQ feedback. The starting point t0 in example 400 may represent a start of a time window for the UE to collect HARQ feedback. The starting point t0 may be when the slot format changed or an earliest deferred SPS PUCCH ACK/NACK.

As indicated above, FIG. 4 is provided as an example. Other examples may differ from what is described with regard to FIG. 4.

Figure 5:
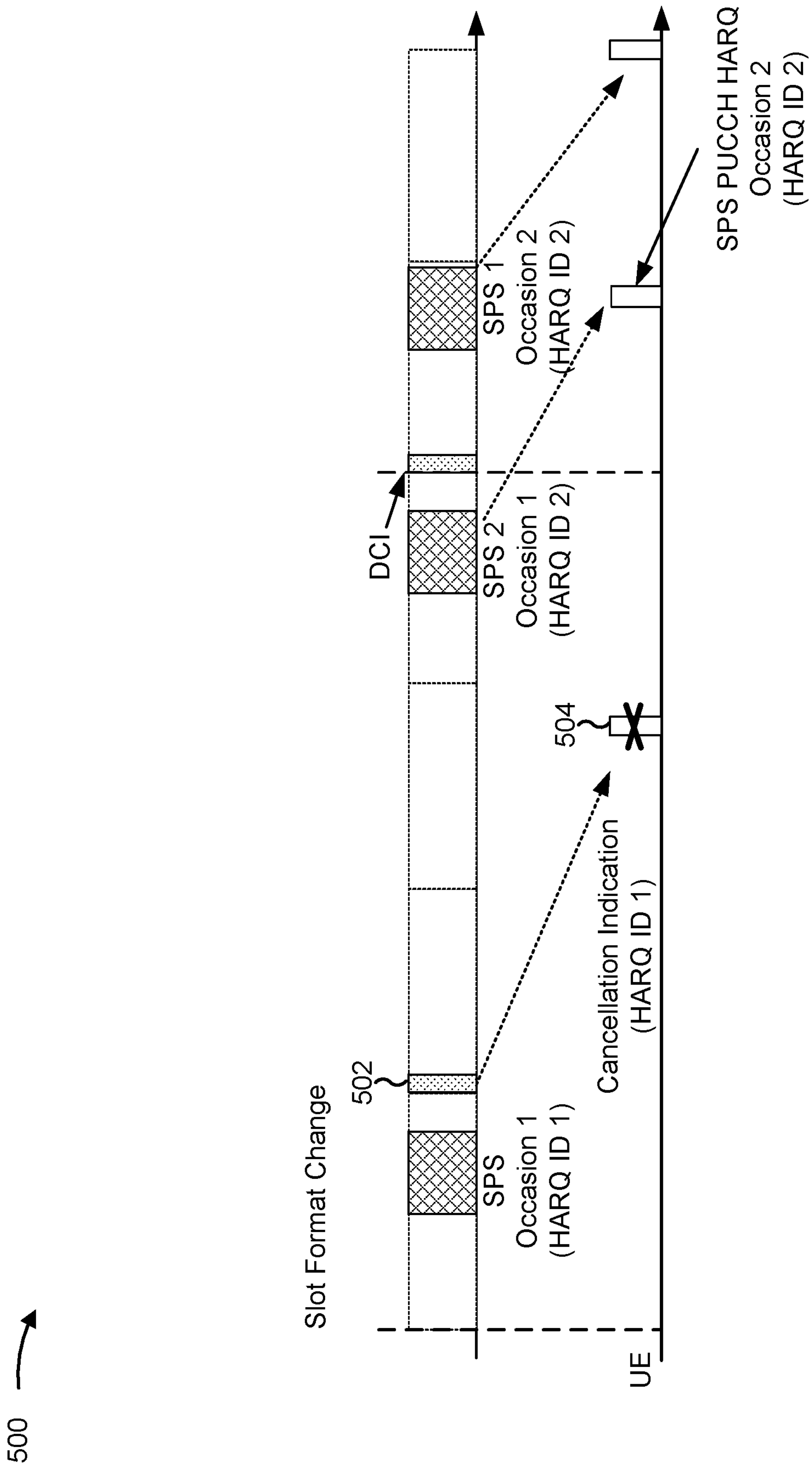
FIG. 5 is a diagram illustrating an example of DCI for triggering HARQ when there is a slot format change, in accordance with the present disclosure.

FIG. 5 is a diagram illustrating an example 500 of DCI for triggering HARQ when there is a slot format change, in accordance with the present disclosure.

Example 500 shows multiple slots in a slot format, where the slot format has changed for a UE. In contrast to the HARQ deferral of example 400, example 500 involves a HARQ cancellation indication. The UE may receive DCI 502 that indicates cancellation of HARQ 504 for a HARQ process.

Currently, the DCI for triggering HARQ when there is a slot format change is a single bit that requests HARQ for the last 16 HARQ processes. This may include 16 or 24 bits on the uplink. This uplink overhead consumes uplink resources that could be used for data or other control information. Throughput may be reduced, and latency may be increased. While HARQ feedback may infrequently need to be collected due to a slot format change, the HARQ feedback that is deferred or cancelled may nonetheless still be necessary for an URLLC application.

As indicated above, FIG. 5 is provided as an example. Other examples may differ from what is described with regard to FIG. 5.

Figure 6:
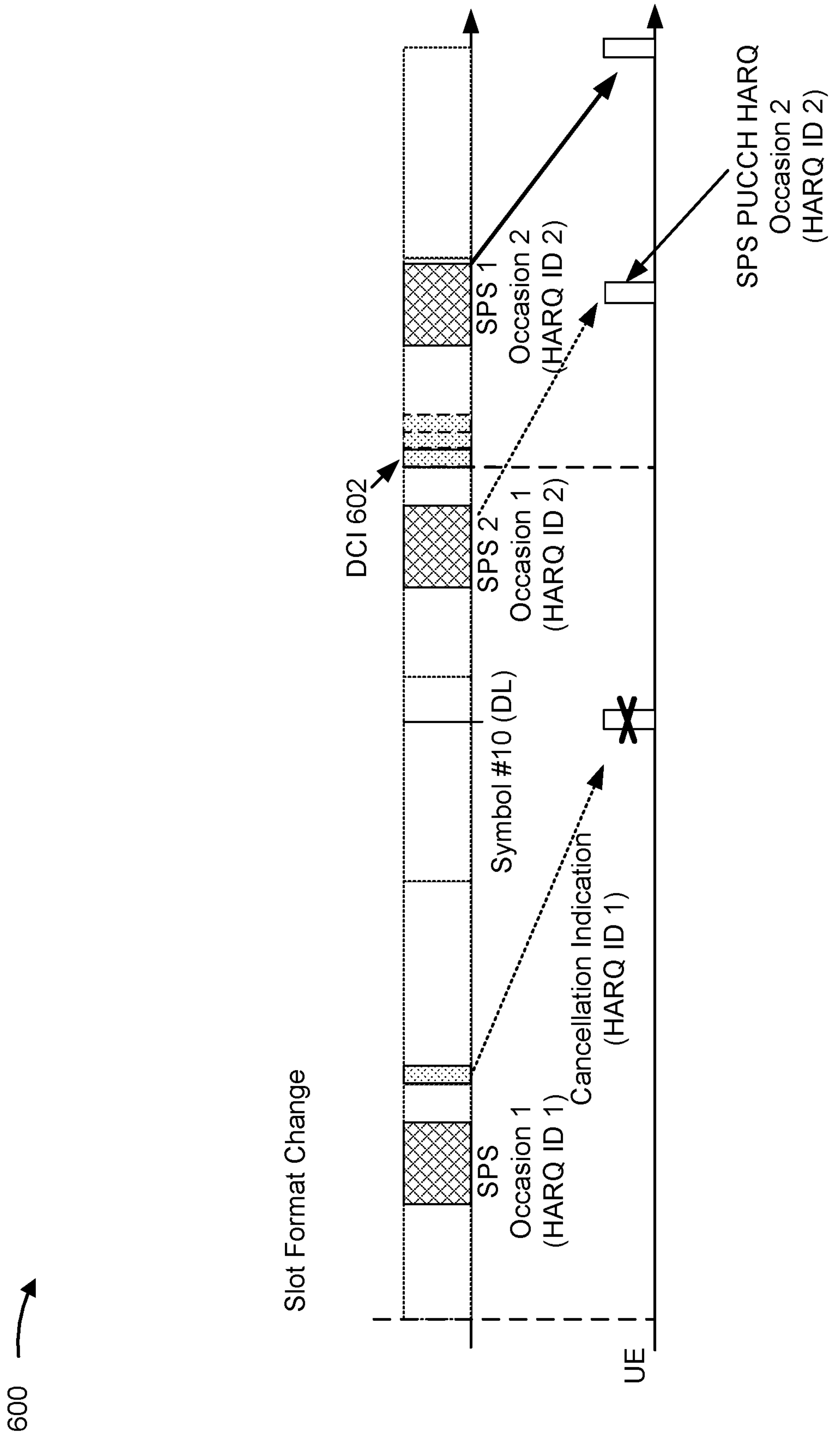
FIG. 6 is a diagram illustrating an example of using DCI for triggering HARQ, in accordance with the present disclosure.

FIG. 6 is a diagram illustrating an example 600 of DCI for triggering HARQ when there is a slot format change, in accordance with the present disclosure.

According to various aspects described herein, a UE may use a hybrid triggering for modified type 3 codebook HARQ bits. The type 3 codebook HARQ bits may be modified so as to provide less than 16 bits. In this way, the uplink overhead is reduced and uplink signaling resources are conserved to increase throughput and reduce latency. The hybrid triggering may involve two options.

For a first option, a network entity may configure the UE, via RRC signaling, a number of HARQ bits to report if a single bit DCI is received for one-shot feedback. (e.g., URLLC-HARQ-ACK-OneShotFeedback). The RRC signaling may also include parameters for a starting HARQ bit, which may be a first instance of deferred HARQ or cancelled HARQ. For example, RRC parameters may configure the UE to provide 4 HARQ bits for the last 4 HARQ processes, starting at a first deferred HARQ or cancelled HARQ. Accordingly, when the 1 bit DCI is received, the UE transmits up to 4 HARQ bits. In this way, the HARQ feedback is captured for any HARQ that is deferred or cancelled due to a slot format change, while reducing the uplink overhead from 16 bits to 4 bits. This example involves 4 bits but other numbers of HARQ bits may be used that are less than a currently used number of HARQ bits. This first option has lower flexibility, as the number of HARQ bits and a starting HARQ bit (e.g., slot number, sub-slot number) are configured during RRC signaling (such as at establishment of a radio access bearer). There may be higher PUCCH overhead as more HARQ bits may be transmitted than necessary, but there is little DCI overhead as the DCI is limited to a single bit. Example 600 shows that DCI 602 may be 1 bit.

A second option may provide even greater flexibility. For the second option, the DCI may include the configuration of the HARQ bits. That is, the DCI may indicate the number of HARQ bits to report. The DCI may also indicate a starting HARQ bit. The DCI may also include an activation bit to indicate that one-shot feedback is to be provided. In this way, the UE may receive a specific number of HARQ bits to report that may be a more accurate number. Because the DCI may be sent with more recent information than RRC signaling, the UE may be provided with a more accurate number of HARQ bits or a more accurate starting HARQ bit. This may reduce PUCCH overhead. However, this second option may involve more DCI overhead, and more than 1 bit may be needed to indicate the number of HARQ bits and/or a starting HARQ bit. Example 600 shows that DCI 602 may include multiple bits.

In some aspects, a combination of the first option and the second option may be used. For example, the starting bit may be configured by RRC signaling, and the number of HARQ bits may be configured by the DCI, and vice versa. By using the first option, the second option, or a combination thereof, the UE may have more flexibility to report missing HARQ and to do so with less overhead.

As indicated above, FIG. 6 is provided as an example. Other examples may differ from what is described with regard to FIG. 6.

Figure 7:
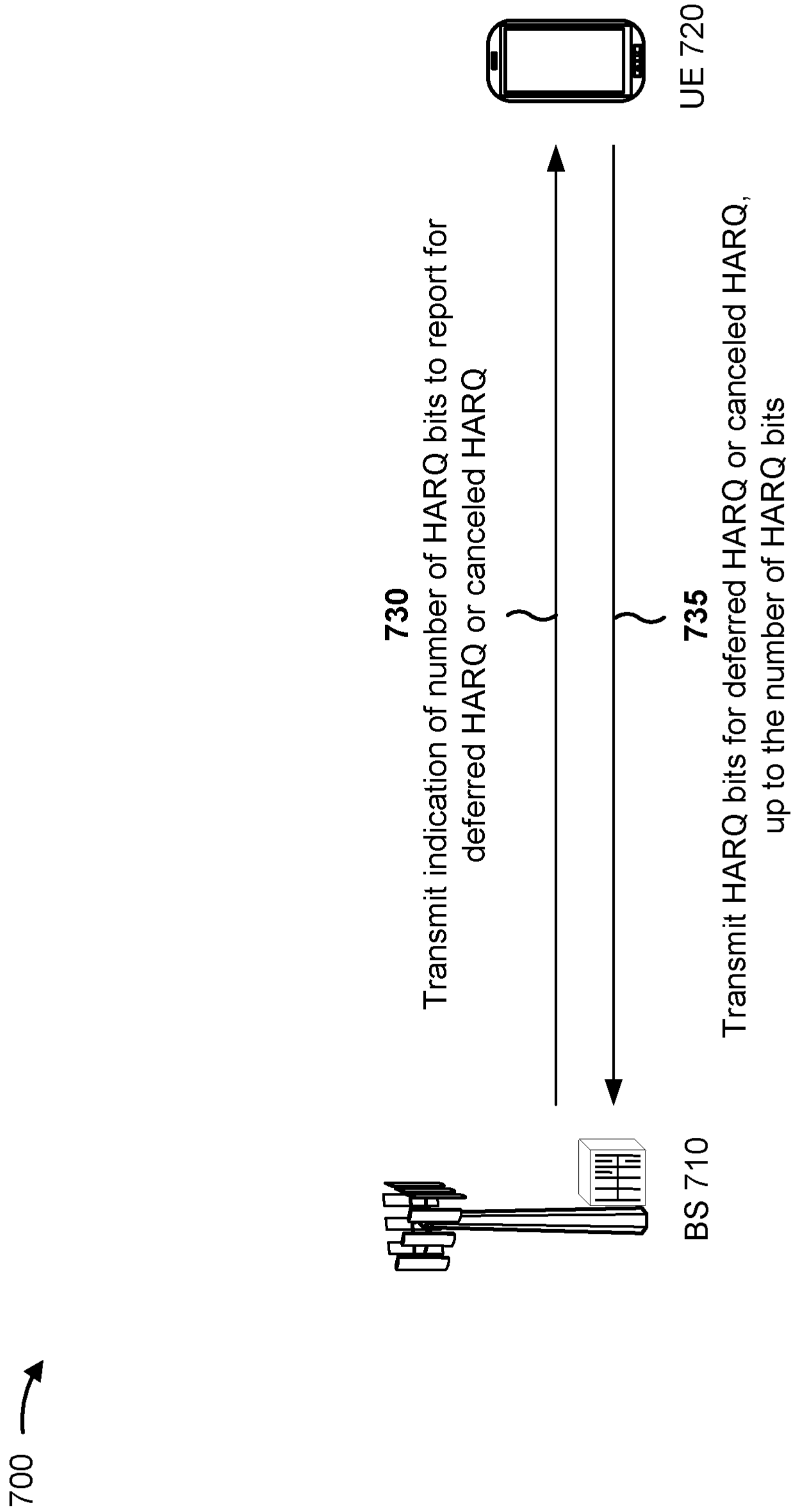
FIG. 7 is a diagram illustrating an example of using DCI for triggering HARQ, in accordance with the present disclosure.

FIG. 7 is a diagram illustrating an example 700 of using DCI for triggering HARQ, in accordance with the present disclosure. FIG. 7 shows a network entity, such as BS 710 (e.g., a BS 110 depicted in FIGS. 1 and 2), and a UE 720 (e.g., a UE 120 depicted in FIGS. 1 and 2) that may communicate with each other on a downlink or an uplink in a wireless network such as wireless network 100 depicted in FIG. 1.

As shown by reference number 730, BS 710 may transmit an indication of the number of HARQ bits that UE 720 is to report for deferred HARQ or cancelled HARQ. The number of HARQ bits may be, for example, less than 16 bits or less than 8 bits. In some aspects, BS 710 may transmit the indication in RRC signaling. For example, BS 710 may include a field (e.g., nrOfHARQBitsModifiedType3CB) for the number of HARQ bits to report for deferred HARQ in an SPS configuration. BS 710 may also include a field (e.g., nrofHARQ-BitsModifiedType3CB) for the number of HARQ bits to report for cancelled HARQ. BS 710 may also indicate the starting HARQ bit.

In some aspects, BS 710 may transmit the indication of the number of HARQ bits in the DCI for one-shot feedback. BS 710 may also indicate the starting HARQ bit in the DCI. In some aspects, the DCI may separate deferred HARQ and cancelled HARQ or otherwise identify deferred HARQ or cancelled HARQ.

BS 710 may determine what DCI to provide based at least in part on a UE capability of UE 720, traffic conditions on the uplink, and/or traffic conditions on the downlink. For example, if traffic conditions for the downlink are challenging, BS 710 may use the single bit for DCI and rely on the RRC configuration for the number of bits. If traffic conditions for the uplink are challenging, BS 710 may transmit DCI that indicates fewer HARQ bits than an earlier RRC configuration.

As shown by reference number 735, UE 720 may transmit the HARQ bits for the deferred HARQ and/or cancelled HARQ, up to the number of HARQ bits that was indicated. By providing such flexibility, BS 710 and UE 720 may improve throughput and reduce latency while capturing HARQ for highly reliable applications.

As indicated above, FIG. 7 is provided as an example. Other examples may differ from what is described with regard to FIG. 7.

Figure 8:
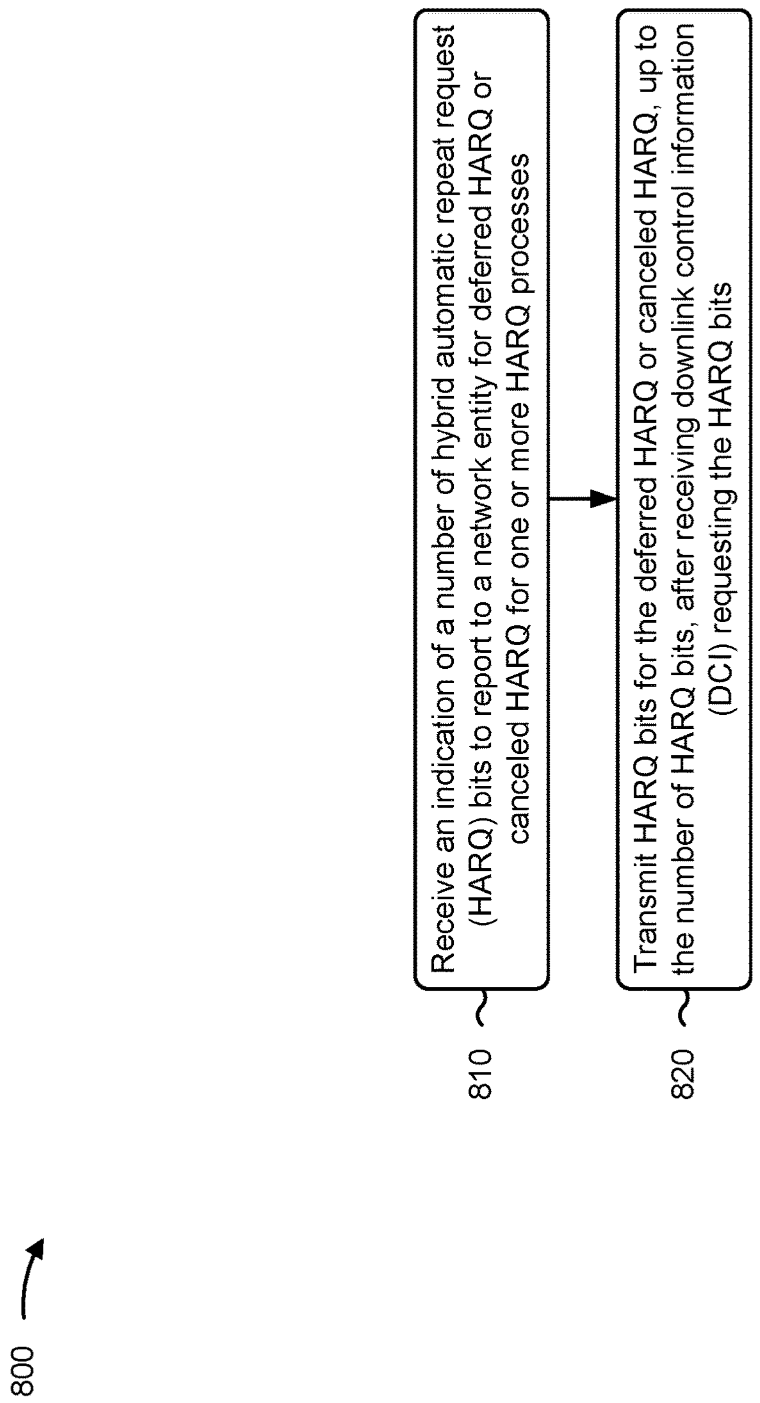
FIG. 8 is a diagram illustrating an example process performed, for example, by a network entity, in accordance with the present disclosure.

FIG. 8 is a diagram illustrating an example process 800 performed, for example, by a UE, in accordance with the present disclosure. Example process 800 is an example where the UE (e.g., a UE 120 depicted in FIGS. 1-2, the UE depicted in FIGS. 4-6, UE 720 depicted in FIG. 7) performs operations associated with dynamic triggering of type 3 codebook HARQ feedback.

As shown in FIG. 8, in some aspects, process 800 may include receiving an indication of a number of HARQ bits to report to a network entity for deferred HARQ or cancelled HARQ for one or more HARQ processes (block 810). For example, the UE (e.g., using reception component 1002 depicted in FIG. 10) may receive an indication of a number of HARQ bits to report to a network entity for deferred HARQ or cancelled HARQ for one or more HARQ processes, as described above.

As further shown in FIG. 8, in some aspects, process 800 may include transmitting HARQ bits for the deferred HARQ or cancelled HARQ, up to the number of HARQ bits, after receiving DCI requesting the HARQ bits (block 820). For example, the UE (e.g., using transmission component 1004 depicted in FIG. 10) may transmit HARQ bits for the deferred HARQ or cancelled HARQ, up to the number of HARQ bits, after receiving DCI requesting the HARQ bits, as described above.

Process 800 may include additional aspects, such as any single aspect or any combination of aspects described below and/or in connection with one or more other processes described elsewhere herein.

In a first aspect, process 800 includes transmitting the HARQ bits using type 3 codebook.

In a second aspect, alone or in combination with the first aspect, the indication is received in an RRC message, and the DCI is 1 bit.

In a third aspect, alone or in combination with one or more of the first and second aspects, the RRC message indicates a starting HARQ bit for reporting the HARQ bits.

In a fourth aspect, alone or in combination with one or more of the first through third aspects, the indication is received in the DCI.

In a fifth aspect, alone or in combination with one or more of the first through fourth aspects, the DCI indicates a starting HARQ bit for reporting the HARQ bits.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
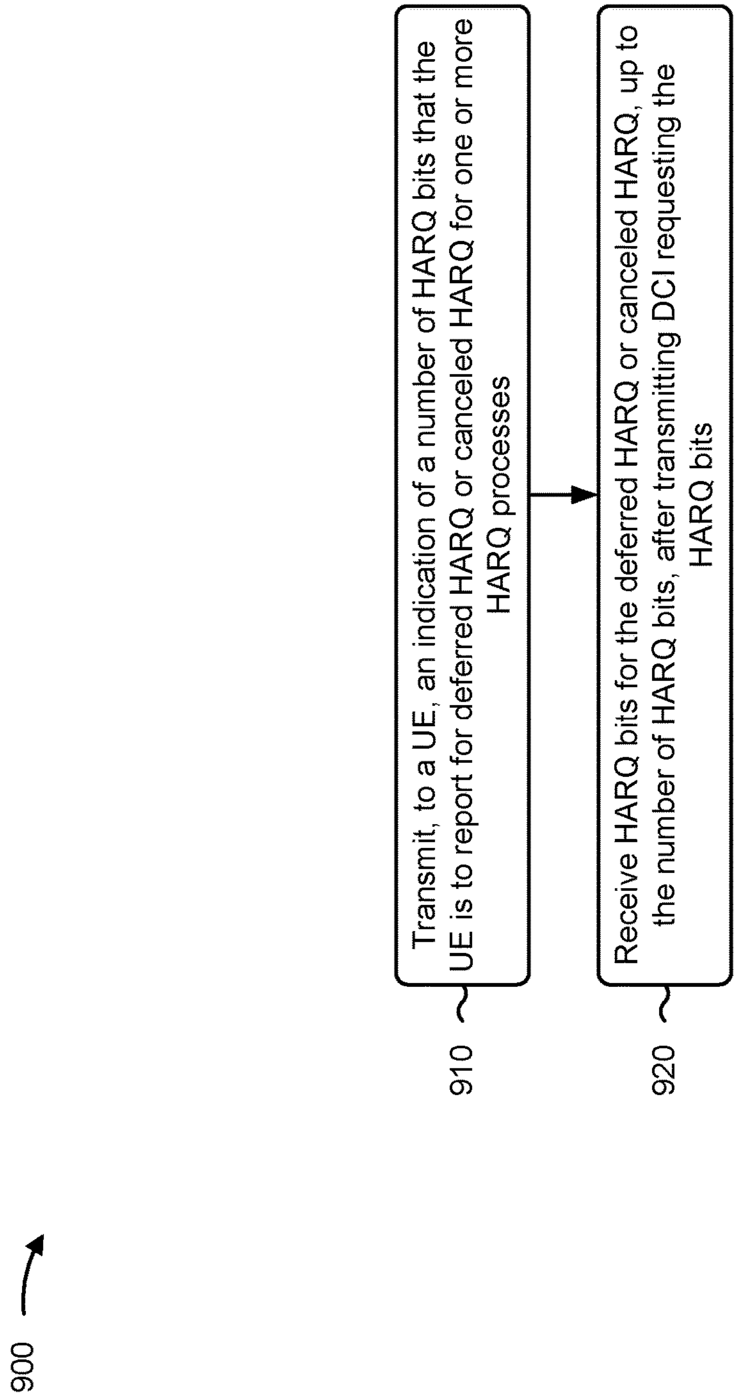
FIG. 9 is a diagram illustrating an example process performed, for example, by a network entity, in accordance with the present disclosure.

FIG. 9 is a diagram illustrating an example process 900 performed, for example, by a network entity, in accordance with the present disclosure. Example process 900 is an example where the network entity (e.g., a base station 110 depicted in FIGS. 1-2, BS 710 depicted in FIG. 7) performs operations associated with dynamic triggering of type 3 codebook HARQ feedback.

As shown in FIG. 9, in some aspects, process 900 may include transmitting, to a UE, an indication of a number of HARQ bits that the UE is to report for deferred HARQ or cancelled HARQ for one or more HARQ processes (block 910). For example, the network entity (e.g., using transmission component 1104 depicted in FIG. 11) may transmit, to a UE, an indication of a number of HARQ bits that the UE is to report for deferred HARQ or cancelled HARQ for one or more HARQ processes, as described above.

As further shown in FIG. 9, in some aspects, process 900 may include receiving HARQ bits for the deferred HARQ or cancelled HARQ, up to the number of HARQ bits, after transmitting DCI requesting the HARQ bits (block 920). For example, the network entity (e.g., using reception component 1102 depicted in FIG. 11) may receive HARQ bits for the deferred HARQ or cancelled HARQ, up to the number of HARQ bits, after transmitting DCI requesting the HARQ bits, as described above.

Process 900 may include additional aspects, such as any single aspect or any combination of aspects described below and/or in connection with one or more other processes described elsewhere herein.

In a first aspect, process 900 includes receiving the HARQ bits using type 3 codebook.

In a second aspect, alone or in combination with the first aspect, process 900 includes transmitting the indication in an RRC message and transmitting the DCI as 1 bit.

In a third aspect, alone or in combination with one or more of the first and second aspects, the RRC message indicates a starting HARQ bit for reporting the HARQ bits.

In a fourth aspect, alone or in combination with one or more of the first through third aspects, process 900 includes transmitting the indication in the DCI.

In a fifth aspect, alone or in combination with one or more of the first through fourth aspects, the DCI indicates a starting HARQ bit for reporting the HARQ bits.

In a sixth aspect, alone or in combination with one or more of the first through fifth aspects, process 900 includes selecting the number of HARQ bits based at least in part on one or more of a UE capability, uplink traffic conditions, or downlink traffic conditions.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
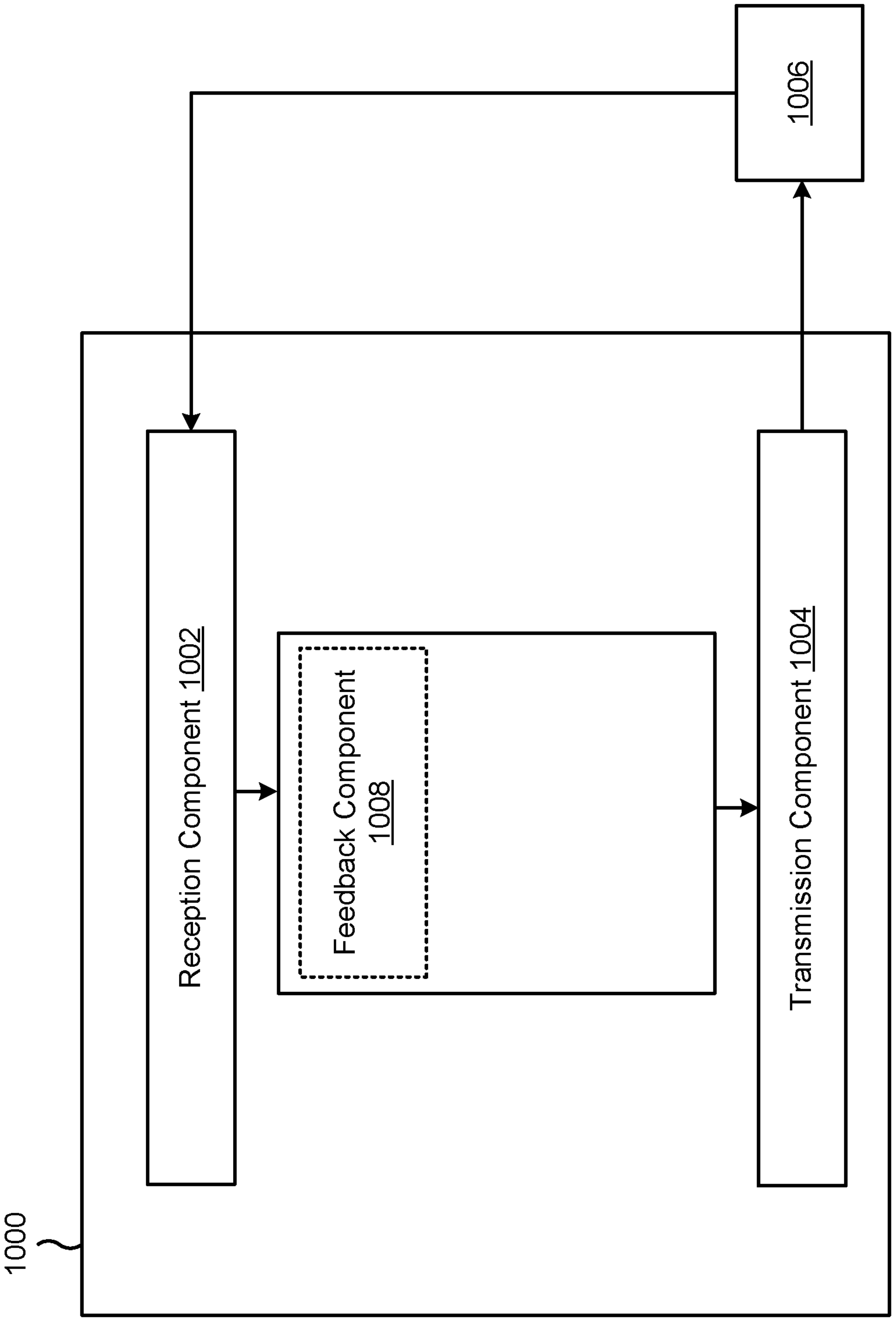
FIGS. 10-11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network entity, or another wireless communication device) using the reception component 1002 and the transmission component 1004. As further shown, the apparatus 1000 may include a feedback component 1008, among other examples.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive an indication of a number of HARQ bits to report to a network entity for deferred HARQ or cancelled HARQ for one or more HARQ processes. After receiving DCI requesting the HARQ bits, the feedback component 1008 may generate feedback for one or more HARQ processes based at least in part on successful decoding of PUSCH messages scheduled with SPS scheduling. The feedback may include one or more HARQ bits for each HARQ process with deferred HARQ or cancelled HARQ. The transmission component 1004 may transmit the HARQ bits for the deferred HARQ or cancelled HARQ, up to the number of HARQ bits. The transmission component 1004 may transmit the HARQ bits using a type 3 codebook, or a modified type 3 codebook.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
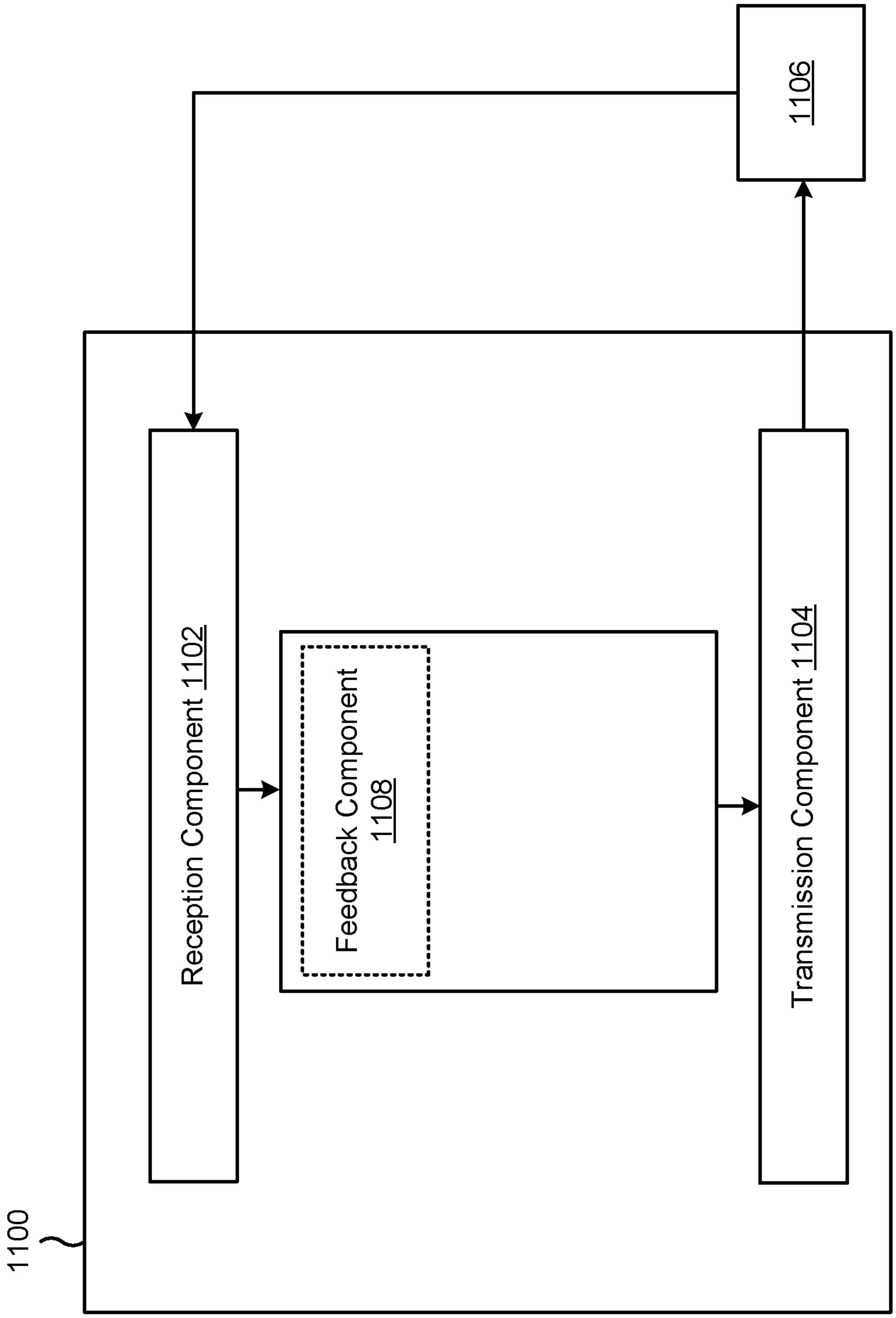

FIG. 11 is a block diagram of an example apparatus 1100 for wireless communication. The apparatus 1100 may be a network entity, or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a network entity, or another wireless communication device) using the reception component 1102 and the transmission component 1104. As further shown, the apparatus 1100 may include a feedback component 1108, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network entity described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the network entity described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the network entity described above in connection with FIG. 2. In some aspects, the transmission component 1104 may be co-located with the reception component 1102 in a transceiver.

The transmission component 1104 may transmit, to a UE, an indication of a number of HARQ bits that the UE is to report for deferred HARQ or cancelled HARQ for one or more HARQ processes. The feedback component 1108 may generate DCI for triggering feedback for one or more HARQ processes based at least in part on a change in slot format. The reception component 1102 may receive HARQ bits for the deferred HARQ or cancelled HARQ, up to the number of HARQ bits, after transmitting the DCI requesting the HARQ bits. The reception component 1102 may receive the HARQ bits using type 3 codebook.

The transmission component 1104 may transmit the indication in an RRC message and transmit the DCI as one bit. The transmission component 1104 may transmit the indication in the DCI. The feedback component 1108 may select the number of HARQ bits based at least in part on one or more of a UE capability, uplink traffic conditions, or downlink traffic conditions.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: receiving an indication of a number of hybrid automatic repeat request (HARQ) bits to report to a network entity for deferred HARQ or cancelled HARQ for one or more HARQ processes; and transmitting HARQ bits for the deferred HARQ or cancelled HARQ, up to the number of HARQ bits, after receiving downlink control information (DCI) requesting the HARQ bits.

Aspect 2: The method of Aspect 1, further comprising transmitting the HARQ bits using type 3 codebook.

Aspect 3: The method of Aspect 1 or 2, wherein the indication is received in a radio resource control (RRC) message, and wherein the DCI is 1 bit.

Aspect 4: The method of Aspect 3, wherein the RRC message indicates a starting HARQ bit for reporting the HARQ bits.

Aspect 5: The method of Aspect 1 or 2, wherein the indication is received in the DCI.

Aspect 6: The method of Aspect 5, wherein the DCI indicates a starting HARQ bit for reporting the HARQ bits.

Aspect 7: A method of wireless communication performed by a network entity, comprising: transmitting, to a user equipment (UE), an indication of a number of hybrid automatic repeat request (HARQ) bits that the UE is to report for deferred HARQ or cancelled HARQ for one or more HARQ processes; and receiving HARQ bits for the deferred HARQ or cancelled HARQ, up to the number of HARQ bits, after transmitting downlink control information (DCI) requesting the HARQ bits.

Aspect 8: The method of Aspect 7, further comprising receiving the HARQ bits using type 3 codebook.

Aspect 9: The method of Aspect 7 or 8, further comprising transmitting the indication in a radio resource control (RRC) message and transmitting the DCI as 1 bit.

Aspect 10: The method of Aspect 9, wherein the RRC message indicates a starting HARQ bit for reporting the HARQ bits.

Aspect 11: The method of Aspect 7 or 8, further comprising transmitting the indication in the DCI.

Aspect 12: The method of Aspect 11, wherein the DCI indicates a starting HARQ bit for reporting the HARQ bits.

Aspect 13: The method of any of Aspects 7-12, further comprising selecting the number of HARQ bits based at least in part on one or more of a UE capability, uplink traffic conditions, or downlink traffic conditions.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the memory and the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
- a memory; and
- one or more processors operatively coupled to the memory, the one or more processors configured to:
  - receive an indication, of a number of hybrid automatic repeat request (HARQ) bits to report to a network entity for deferred HARQ or cancelled HARQ for one or more HARQ processes,
  - wherein the indication is received in a radio resource control (RRC) message, wherein the RRC message indicates a starting HARQ bit for reporting the HARQ bits, and wherein the starting HARQ bit corresponds to a first instance of the deferred HARQ or the cancelled HARQ; and
  - transmit HARQ bits for the deferred HARQ or the cancelled HARQ, up to the number of HARQ bits, after receiving downlink control information (DCI) requesting the HARQ bits.

2. The UE of claim 1,
wherein the one or more processors are configured to transmit the HARQ bits using type 3 codebook.

3. The UE of claim 1,
wherein the DCI is 1 bit.

4. The UE of claim 1,
wherein the RRC message indicates the number of HARQ bits to report in a semi-persistent scheduling configuration.

5. The UE of claim 1,
wherein the RRC message indicates the number of HARQ bits to report in a physical downlink shared channel serving cell configuration.

6. The UE of claim 1,
wherein the RRC message is received as part of establishing a radio access bearer.

7. The UE of claim 1,
wherein the indication is received in the DCI.

8. The UE of claim 7,
wherein the DCI indicates the starting HARQ bit for reporting the HARQ bits.

9. The UE of claim 1,
wherein the HARQ bits are for cancelled HARQ indications.

10. The UE of claim 1,
wherein the HARQ bits are for deferred semi-persistent scheduling physical uplink control channel HARQ deferrals.

11. The UE of claim 1,
wherein the number of HARQ bits is less than 16.

12. The UE of claim 1,
wherein the number of HARQ bits is less than 8.

13. The UE of claim 1,
wherein a time window for the UE to collect HARQ feedback starts when a slot format is changed or at a control channel associated with the deferred HARQ.

14. A network entity for wireless communication, comprising:
- a memory; and
- one or more processors operatively coupled to the memory, the one or more processors configured to:
  - transmit an indication of a number of hybrid automatic repeat request (HARQ) bits that a user equipment (UE) is to report for deferred HARQ or cancelled HARQ for one or more HARQ processes,
  - wherein the indication is transmitted in a radio resource control (RRC) message, wherein the RRC message indicates a starting HARQ bit for reporting the HARQ bits, and wherein the starting HARQ bit corresponds to a first instance of the deferred HARQ or the cancelled HARQ; and
  - receive HARQ bits for the deferred HARQ or the cancelled HARQ, up to the number of HARQ bits, after transmitting downlink control information (DCI) requesting the HARQ bits.

15. The network entity of claim 14,
wherein the one or more processors are configured to receive the HARQ bits using type 3 codebook.

16. The network entity of claim 14,
wherein the one or more processors are configured to transmit the DCI as 1 bit.

17. The network entity of claim 14, wherein the RRC message indicates the number of HARQ bits to report in a semi-persistent scheduling configuration.

18. The network entity of claim 14, wherein the RRC message indicates the number of HARQ bits to report in a physical downlink shared channel serving cell configuration.

19. The network entity of claim 14, wherein the one or RRC message is part of establishing a radio access bearer.

20. The network entity of claim 14, wherein the one or more processors are configured to transmit the indication in the DCI.

21. The network entity of claim 20, wherein the DCI indicates the starting HARQ bit for reporting the HARQ bits.

22. The network entity of claim 14, wherein the HARQ bits are for cancelled HARQ indications.

23. The network entity of claim 14, wherein the HARQ bits are for deferred semi-persistent scheduling physical uplink control channel HARQ deferrals.

24. The network entity of claim 14, wherein the number of HARQ bits is less than 16.

25. The network entity of claim 14, wherein the number of HARQ bits is less than 8.

26. The network entity of claim 14, wherein the one or more processors are configured to select the number of HARQ bits based at least in part on one or more of a UE capability, uplink traffic conditions, or downlink traffic conditions.

27. A method of wireless communication performed by a user equipment (UE), comprising:

receiving an indication of a number of hybrid automatic repeat request (HARQ) bits to report to a network entity for deferred HARQ or cancelled HARQ for one or more HARQ processes, wherein the indication is received in a radio resource control (RRC) message, wherein the RRC message indicates a starting HARQ bit for reporting the HARQ bits, and wherein the starting HARQ bit corresponds to a first instance of the deferred HARQ or the cancelled HARQ; and transmitting HARQ bits for the deferred HARQ or the cancelled HARQ, up to the number of HARQ bits, after receiving downlink control information (DCI) requesting the HARQ bits.

28. The method of claim 27, wherein the RRC message indicates the number of HARQ bits to report in a semi-persistent scheduling configuration.

29. The method of claim 27, wherein the RRC message indicates the number of HARQ bits to report in a physical downlink shared channel serving cell configuration.

30. A method of wireless communication performed by a network entity, comprising:

transmitting an indication of a number of hybrid automatic repeat request (HARQ) bits that a user equipment (UE) is to report for deferred HARQ or cancelled HARQ for one or more HARQ processes, wherein the indication is transmitted in a radio resource control (RRC) message, wherein the RRC message indicates a starting HARQ bit for reporting the HARQ bits, and wherein the starting HARQ bit corresponds to a first instance of the deferred HARQ or the cancelled HARQ; and receiving HARQ bits for the deferred HARQ or the cancelled HARQ, up to the number of HARQ bits, after transmitting downlink control information (DCI) requesting the HARQ bits.

* * * * *